United States Patent
Baker et al.

(10) Patent No.: US 10,846,335 B2
(45) Date of Patent: *Nov. 24, 2020

(54) BROWSING VIDEOS VIA A SEGMENT LIST

(71) Applicant: Microsoft Technology Licensing, LLC, Redmond, WA (US)

(72) Inventors: Simon Baker, Los Altos Hills, CA (US); Eran Borenstein, Los Gatos, CA (US); Mehmet Nejat Tek, Santa Clara, CA (US); Eitan Sharon, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,283

(22) Filed: Jul. 3, 2018

(65) Prior Publication Data

US 2018/0314758 A1 Nov. 1, 2018

Related U.S. Application Data

(63) Continuation of application No. 14/180,901, filed on Feb. 14, 2014, now Pat. No. 10,037,380.

(51) Int. Cl.
| | | |
|---|---|---|
| *G06F 3/00* | (2006.01) |
| *G06F 16/74* | (2019.01) |
| *G06F 16/71* | (2019.01) |
| *G11B 27/28* | (2006.01) |
| *G11B 27/11* | (2006.01) |
| *G11B 27/34* | (2006.01) |
| *G06F 3/0482* | (2013.01) |
| *G06F 3/0484* | (2013.01) |
| *G06F 3/01* | (2006.01) |

(52) U.S. Cl.
CPC .......... *G06F 16/743* (2019.01); *G06F 3/0482* (2013.01); *G06F 3/04842* (2013.01); *G06F 16/71* (2019.01); *G06F 16/745* (2019.01); *G11B 27/11* (2013.01); *G11B 27/28* (2013.01); *G11B 27/34* (2013.01)

(58) Field of Classification Search
CPC ...... G06F 16/743; G06F 16/71; G06F 16/745; G06F 3/0482
See application file for complete search history.

(56) References Cited

U.S. PATENT DOCUMENTS

| | | | |
|---|---|---|---|
| 7,801,910 B2 | 9/2010 | Houh et al. | |
| 8,370,348 B1 * | 2/2013 | Reilly | G06F 16/9535 707/731 |
| 9,191,639 B2 | 11/2015 | Kuspa | |

(Continued)

*Primary Examiner* — Nicholas Augustine
(74) *Attorney, Agent, or Firm* — Merchant & Gould P.C.

(57) ABSTRACT

A system and method are disclosed for quickly and easily browsing to points of interest within a recorded video. In examples, the present system works in tandem with a segment list which includes a list of different video sequences of a stored video of an event. One typical example of a segment list is a play-by-play (PBP) which is prepared contemporaneously with a sporting event. Segments from a segment list may be associated with, or indexed to, corresponding sequences from the stored video. Thereafter, a user interface allows a user to interactively watch or browse the event by jumping to a desired point in the video for playback by selecting its associated segment from the user interface.

20 Claims, 13 Drawing Sheets

(56) References Cited

U.S. PATENT DOCUMENTS

| | | | |
|---|---|---|---|
| 2007/0250901 A1* | 10/2007 | McIntire | H04N 21/8586 |
| | | | 725/146 |
| 2011/0208722 A1* | 8/2011 | Hannuksela | G11B 27/034 |
| | | | 707/723 |
| 2012/0254917 A1* | 10/2012 | Burkitt | G06F 16/735 |
| | | | 725/40 |
| 2013/0110823 A1* | 5/2013 | Su | G06F 16/9535 |
| | | | 707/723 |
| 2013/0144869 A1* | 6/2013 | Shalabi | G06F 40/131 |
| | | | 707/722 |
| 2014/0161416 A1 | 6/2014 | Chou et al. | |
| 2014/0310746 A1* | 10/2014 | Larsen | G06Q 10/10 |
| | | | 725/37 |

* cited by examiner (Step 222)

Fig. 9

| | |
|---|---|
| New England - NE<br>Baltimore - BAL | |
| 1st Quarter<br>Baltimore - 15:00<br>Baltimore kicked off, touchback<br>BAL 0:0 NE | 150a |
| New England - 15:00<br>1st-10, NE20 15:00 S. Henley rushed to the right for 5 yard gain | 150b |
| 2nd-5, NE25 14:39 T. Brock passed to D. Anderson down the middle for 9 yard gain | 150c |
| 1st-10, NE34 14:17 S. Henley rushed to the left for 3 yard gain | 150d |
| 2nd-7, NE37 13:40 S. Henley rushed to the left for 5 yard gain | 150e |
| 3rd-2, NE42 13:03 T. Brock completes pass to D. Smith for 58 yards. Touchdown.<br>Result: BAL 0:6 NE | 150f |
| BAL 3 12:30 S. Gogalack extra point good.<br>Result: BAL 0:7 NE | 150g |
| Baltimore - 12:30<br>1st-10, BAL13 12:48 R. Ritch rushed to the right for 2 yard gain | 150h |
| 2nd-8, BAL15 12:17 R. Ritch rushed to the left for 4 yard gain | 150i |
| 3rd-4, BAL19 11:41 J. Felton incomplete pass to the left | 150j |
| 4th-4, BAL19 11:24 S. Keller punt. W. Walsh returned punt for no gain. New England committed 10 yard penalty<br>Result: Punt, BAL 0:7 NE | 150k |

| Inn | Score | Out | Rnner | Pit(cnt) | R/O | @Bat | Batter | Pitcher | Play Description |
|---|---|---|---|---|---|---|---|---|---|
| Top of the 1st, Seals Batting, Tied 0-0, Monarch's J. Mathers facing 1-2-3 | | | | | | | | | |
| t1 | 0-0 | 0 | --- | 1,(0-0) | O | TBR | D. Jenner | J. Mathers | Popfly: SS (Deep SS) — 150a |
| t1 | 0-0 | 1 | --- | 4,(1-2) | O | TBR | M. Johnson | J. Mathers | Groundout: 2B-1B (2B-1B) — 150b |
| t1 | 0-0 | 2 | --- | 5,(1-2) | O | TBR | B. Zoeller | J. Mathers | Strikeout Swinging — 150c |
| 0 runs, 0 hits, 0 errors, 0 LOB. Rays 0, Orioles 0. | | | | | | | | | |
| Bottom of the 1st, Orioles Batting, Tied 0-0, Rays' Roberto Hernandez facing 1-2-3 | | | | | | | | | |
| b1 | 0-0 | 0 | --- | 4,(2-1) | O | BAL | N. McLouth | R. Rodgers | Single to LF (Ground Ball) — 150d |
| b1 | 0-0 | 0 | 1- | 5,(2-2) | O | BAL | M. Machado | R. Rodgers | Groundout: SS-1B; McLouth to 2B — 150e |
| b1 | 0-0 | 1 | -2- | 2,(1-0) | R | BAL | N. Markakis | R. Rodgers | Double to RF (Line Drive to Deep RF) — 150f |
| McLouth Scores | | | | | | | | | |
| b1 | 1-0 | 1 | -2- | 3,(0-2) | RR | BAL | A. Jackson | R. Rodgers | Home Run (Line Drive to Deep LF); Markakis Scores — 150g |
| b1 | 3-0 | 1 | --- | 5,(2-2) | R | BAL | C. Davies | R. Rodgers | Home Run (Fly Ball to Deep LF-CF) — 150h |
| b1 | 4-0 | 1 | --- | 2,(0-1) | O | BAL | M. Waters | R. Rodgers | Groundout: P-1B (Front of Home) — 150i |
| b1 | 4-0 | 2 | --- | 2,(0-1) | | BAL | J. Harding | R. Rodgers | Single to P (Ground Ball to Short 3B Line) — 150j |
| b1 | 4-0 | 2 | 1- | 5,(1-2) | | BAL | C. Dickerson | R. Rodgers | Single to RF (Ground Ball thru 2B-1B); Harding to 2B — 150k |
| b1 | 4-0 | 2 | 12- | 5,(0-2) | | BAL | Y. Nathenson | R. Rodgers | Single to SS (Ground Ball); Hardy to 3B; Dickerson to 2B — 150l |
| b1 | 4-0 | 2 | 123 | 3,(0-2) | O | BAL | N. McCloud | R. Rodgers | Strikeout Looking — 150m |
| 4 runs, 7 hits, 0 errors, 3 LOB. Rays 0, Orioles 4. | | | | | | | | | |

| David Wordman Show<br>October 12, 2011<br>Episode 3042 | 150a |
|---|---|
| Opening Montage – David Sheller and the G-Flat Band | 150b |
| Opening Monologue – Vice President Jones travels to Egypt; Halley Hunter goes Shopping | 150c |
| Top Six List – Top Six Reasons to Leave your Job | 150d |
| Skit – "Does it Sink?" | 150e |
| First Guest – Jack Halley and his Animals - Vulture and a Python | 150f |
| Skit – Cute Kid Tricks | 150g |
| Second Guest – Pamela Alderson | 150h |
| Musical Guests – The Pop Eye Band | 150i |

| 1st Quarter<br>Baltimore - 15:00<br>Baltimore kicked off, touchback<br>BAL 0:0 NE<br>150a | New England - 15:00<br>1st-10, NE20 15:00 S. Henley rushed to the right for 5 yard gain<br>150b | 2nd-5, NE25 14:39 T. Brock passed to D. Anderson down the middle for 9 yard gain<br>150c |
|---|---|---|
| 1st-10, NE34 14:17 S. Henley rushed to the left for 3 yard gain<br>150d | 2nd-7, NE37 13:40 S. Henley rushed to the left for 5 yard gain<br>150e | 3rd-2, NE42 13:03 T. Brock completes pass to D. Smith for 58 yards. Touchdown.<br>Result: BAL 0:6 NE<br>150f |
| New England - NE BAL 3 12:30 S. Toms extra point good.<br>Result: BAL 0:7 NE<br>150g | Baltimore - 12:30<br>1st-10, BAL13 12:48 R. Ritch rushed to the right for 2 yard gain<br>150h | 2nd-8, BAL15 12:17 R. Ritch rushed to the left for 4 yard gain<br>150i |
| 3rd-4, BAL19 11:41 J. Felton incomplete pass to the left<br>150j | 4th-4, BAL19 11:24 S. Keller punt. W. Walsh returned punt for no gain. New England committed 10 yard penalty<br>Result: Punt, BAL 0:7 NE<br>150k | 1st-10, NE48 11:17 S. Moore rushed to the right for 5 yard gain<br>150l |

— 150

BROWSING VIDEOS VIA A SEGMENT LIST

CROSS-REFERENCE TO RELATED APPLICATION

This application is a Continuation of U.S. patent application Ser. No. 14/180,901, entitled, "BROWSING VIDEOS VIA A SEGMENT LIST," filed Feb. 14, 2014, which is assigned to the assignee hereof and hereby expressly incorporated by reference herein for all purposes.

BACKGROUND

When watching an event, such as a sporting event, viewers often want to watch various parts of the video interactively. Whether they are watching the event live or whether it has been recorded, viewers enjoy the freedom of going back to previous play or other event and watching it. Conventionally, there are two ways this is currently done. In a system using a DVR, a player may fast forward or rewind through a portions of a recorded event. However, fast forward/rewind takes time, and it is difficult to find a particular play or event of interest.

In a system using interactive video feeds from the World Wide Web, a user may interact with the video feed to jump quickly to different events in the video. However, it is still difficult to locate a particular play or event of interest.

SUMMARY

The present technology, roughly described, relates in general to a system for quickly and easily jumping to points of interest within a recorded video. In embodiments, the present system works in tandem with a segment list which includes a list of different video sequences of a stored video of an event. One typical example of a segment list is a play-by-play (PBP) which is prepared contemporaneously with a sporting event and describes various attributes of segments of the sporting event. For example, a PBP from a football game may have a listing of each play (each play being a segment as used herein), including a time of the play, a yard line where the play began, a description of the play and a result. Embodiments of the present technology may work with PBPs for other sporting events, and segment lists for events which are unrelated to sports. Segment lists may be generated by third parties for use in conjunction with the present technology.

In accordance with the present technology, segments from a segment list may be associated with, or indexed to, corresponding sequences from a video of an event for which the segment list is prepared. Thereafter, a user interface allows a user to interactively watch or browse the event by jumping to a desired point in the video for playback by selecting its associated segment from the user interface.

In one example, the present technology relates to a method of browsing a stored video, comprising: (a) displaying an interactive script including a plurality of script segments, a script segment of the plurality of script segments matched to a sequence of the video described by the script segment; (b) receiving selection of the script segment displayed in said step (a); and (c) displaying the sequence of the video matched to the script segment upon selection of the script segment in said step (b).

In another example, the present technology relates to a computer readable medium for programming a processor to perform a method of browsing a stored video, comprising: (a) indexing segments in a segment list to sequences from the stored video; (b) presenting a graphical user interface including an interactive script having script segments, the script segments corresponding to segments in the segment list; (c) receiving selection of a script segment from the graphical user interface; and (d) displaying the sequence from the video indexed to the segment from the segment list that corresponds to the script segment selected in said step (b).

In a further example, the present technology relates to a system for browsing a stored video, comprising: a first device storing a video; and a second device providing a user interface, the user interface displaying an interactive script including a plurality of script segments describing corresponding video sequences in the stored video, the plurality of script segments indexed to the corresponding video sequences such that selection of a script segment via the user interface results in accessing the corresponding video sequences from the stored video on the first device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

FIGS. 9-12 are examples of interactive scripts displayed on a user interface of a computing device according to embodiments of the present technology.

DETAILED DESCRIPTION

The present technology will now be described with reference to FIGS. 1-14, which in general relate to a system and method for quickly and easily browsing to points of interest within a recorded video. In embodiments, the present system works in tandem with a segment list which includes a list of different segments of an event. One typical example of a segment list is a play-by-play (PBP) which is prepared contemporaneously with a sporting event and describes features and what went on during respective segments of the sporting event. For example, a PBP from a football game may have a listing of each play, including a time of the play, a yard line where the play began, a description of the play and a result. Embodiments of the present technology may work with PBPs for other sporting events, and segment lists for events which are unrelated to sports. Segment lists may be generated by third parties for use in conjunction with the present technology.

In accordance with one aspect of the present technology, segments from a segment list may be associated with, or indexed to, corresponding points or segments in a video of an event for which the segment list is prepared. A length of the video sequence associated with each segment may also be defined. In the example of a football game, a single segment from the segment list and sequence from the video may be a single play (kickoff, running play, passing play, punt, etc). The present technology indexes segments from the segment list to their corresponding sequences in the video where those segments occur and are displayed.

Figure 1:
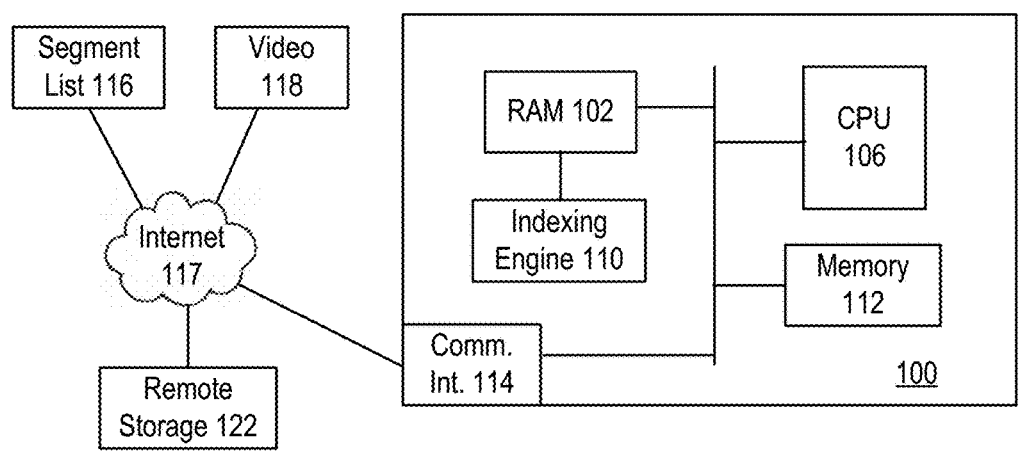
FIG. 1 is a schematic block diagram of a computing system for implementing aspects of the present technology.

Referring to FIG. 1, there is shown a schematic drawing of a computing device 100 including a software engine, referred to herein as an indexing engine 110, for indexing a segment list to a video. FIG. 1 shows certain other features of computing device 100, but a more detailed description of a computing system of which computing device 100 may be an example are provided below with reference to FIGS. 13 and 14. In general, computing device 100 may include random access memory (RAM) 102 and a central processing unit (CPU) 106. The indexing engine 110 may execute on CPU 106 to index segments from a segment list 116 to sequences of a video 118. The segment list 116 and video 118 may be received and stored in the computing device 100 from remote sources via a network connection such as the Internet 117. The video may arrive via an alternate source 119 in further embodiments, such as for example via cable TV, satellite TV, terrestrial broadcast etc. The received segment list may include a segment-by-segment description of different sequences from the video, where one segment from the segment list corresponds to one sequence from the stored video.

The result of the operation of the indexing engine 110 may be a table correlating sequences from the video 118 of determined lengths to their respective corresponding segments from the segment list 116. This table may be stored in a memory 112, which may resident within computing device 100. Alternatively or additionally, the indexing table may be stored remotely from computing device 100, for example on remote storage 122. Details relating to the operation of the indexing engine 110 to generate the indexing table are explained below with reference to the flowchart of FIG. 5.

In embodiments, a segment list is indexed to a single, stored video of an event. However, it is conceivable that a segment list may be indexed to multiple stored videos of the same event. In particular, it may happen that more than one video feed is captured of a given event. For example, more than one network or content provider may capture video of the same event such as a football game. Alternatively or additionally, the same network may capture the event using multiple cameras. Each video feed in these examples will capture the same sequences of the event, but the actual video from the different feeds may differ from each other (different perspectives, focus, etc.). It is conceivable that both videos be stored, and that sequences from both videos be indexed to a single segment list as explained below. When a user browses to sequences from the stored video event as also explained below, the user may be shown sequences from both stored videos, or be given the option to choose one video sequence or another from the different stored videos of the event.

Figure 2:
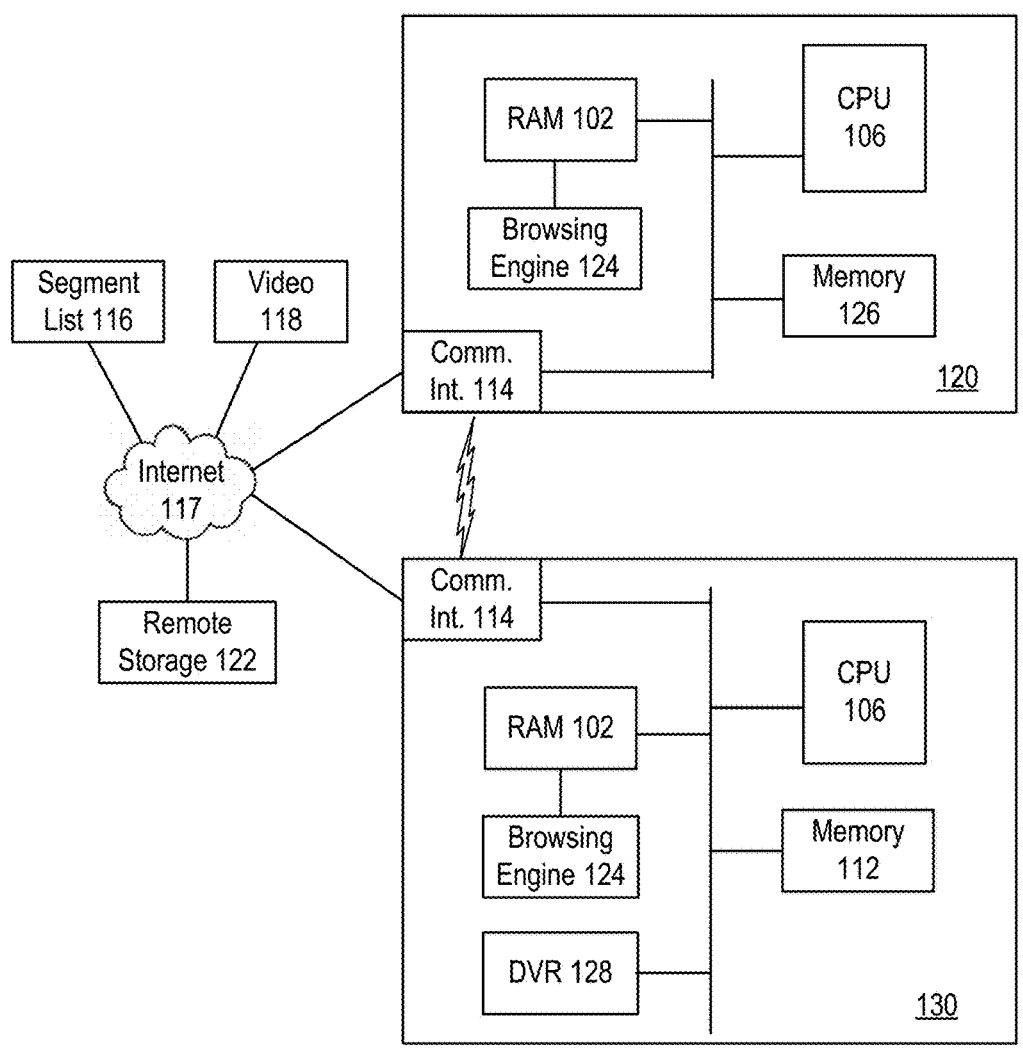
FIG. 2 is a schematic block diagram of a computing system for implementing further aspects of the present technology.
Figure 3:
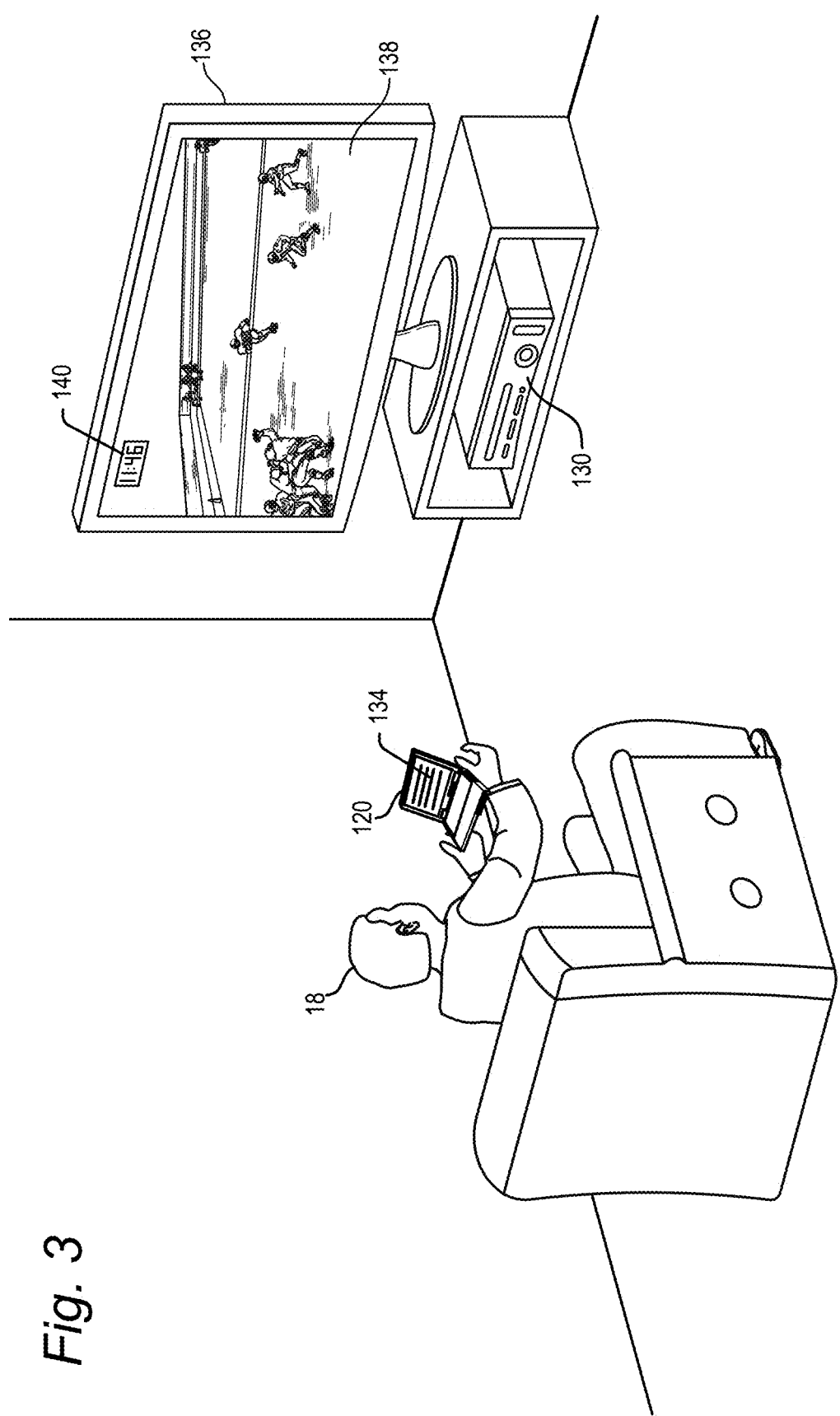
FIG. 3 depicts a system implementing aspects of the present technology.

In accordance with a second aspect of the present technology, after the segment list is indexed to sequences from the stored video, users may interactively watch, or browse, the video by jumping to desired sequences in the video for playback. FIG. 2 shows a schematic drawing of computing devices 120 and 130, one or both of which may execute a software engine referred to herein as a browsing engine 124 for interactive browsing of a stored video. FIG. 2 shows certain other features of computing devices 120, 130, but a more detailed description of a computing system of which computing devices 120, 130 may be examples is provided below with reference to FIGS. 13 and 14. FIG. 3 illustrates a use scenario for the computing devices 120 and 130. As explained below, the browsing experience provided by browsing engine 124 may be implemented on a single computing device in further embodiments.

The computing device 120 may for example be a hand-held computing device such as a mobile phone, laptop or tablet displaying a user interface 104. It may be a computing device other than a hand-held device in further embodiments, such as a desktop computer. The computing device 130 may be a desktop computer, media center PC, a set-top box and the like. It may be a portable computer similar to computing device 120 in further embodiments.

The computing device 130 may be connected to an audio/visual (A/V) device 136 having a display 138 (FIG. 3). The device 136 may for example be a television, a monitor, a high-definition television (HDTV), or the like that may provide a video feed, game or application visuals and/or audio to a user 18. For example, the computing device 130 may include a video adapter such as a graphics card and/or an audio adapter such as a sound card that may provide audio/visual signals associated with a recorded or downloaded video feed. In one embodiment, the audio/visual device 136 may be connected to the computing device 130 via, for example, an S-Video cable, a coaxial cable, an HDMI cable, a DVI cable, a VGA cable, a component video cable, or the like.

In embodiments, the computing device 130 may further include a device such as a digital video recorder (DVR) 128 for recording, storing and playing back video content, such as sports and other events. The video content may be received from an external computer-readable medium such as a DVD, or it may be downloaded to the DVR 128 via a network connection such as the Internet 117. In further embodiments, the DVR 128 may be a standalone unit. Such a standalone unit may be connected in line with the computing device 130 and the A/V device 136.

It is conceivable that the present technology not operate with a DVR within or directly connected to the computing device 130. In such an embodiment, video content may be stored on a remote content server, such as for example remote storage 122, and downloaded via the Internet 117 to the computing device 130 based on selections made by the user as explained below.

In embodiments including two computing devices such as computing devices 120 and 130, the system may be practiced in a distributed computing environment. In such embodiments, devices 120 and 130 may be linked through a communications network implemented for example by communications interfaces 114 in the computing devices 120 and 130. One such distributed computing environment may be accomplished using the Smartglass™ software application from Microsoft Corporation which allows a first computing device to act as a display and/or other peripheral to a second computing device. Thus, the computing device 120 may provide a user interface for browsing video content stored on the computing device 130 for display on the A/V device 136. In such a distributed computing environment, a browsing engine 124 for implementing video browsing aspects of the present technology may be located on one or both computing devices 120 and 130 (in the embodiment shown in FIGS. 2 and 3, it is resident on both devices 120 and 130).

Browsing engine 124 generates a user interface 134 (FIG. 3) presenting an interactive script for a recorded video event that may be stored on DVR 128. When a user selects a particular segment (or group of segments) from the interactive script on the user interface 134, the browsing engine 124 may access the indexing table stored in local memory 112 or remote storage 122 so that the video of that the corresponding video sequence or sequences may then be displayed to the user. Details relating to the browsing engine 124 for making video selections and browsing a video are described below with reference to the flowchart of FIG. 8.

In embodiments, the computing device 100 for indexing a segment list to a video and the computing device 130 for browsing an indexed video may be the same or different computing devices. In embodiments where the devices 100 and 130 are the same, an indexed video may be recorded and saved on DVR 128, and then played back from DVR 128. Additionally, the indexing table generated by the indexing engine 110 may be stored on local memory 112, and accessed from local memory 112 when browsing a video.

In further embodiments (where devices 100 and 130 are the same or different), an index table may be generated and stored for a video using a segment list. Thereafter, it is conceivable that the stored index table may be used to browse a different copy of the video than was used to initially generate the index table. The different copy would be of the same event (having the same discrete sequences), but video browsed by the user can be a downloaded or stored copy of the video that was not used to generate the index table initially.

It is understood that the functions of computing devices 100, 120 and/or 130 may be performed by numerous other general purpose or special purpose computing system environments or configurations. Examples of other well-known computing systems, environments, and/or configurations that may be suitable for use with the system include, but are not limited to, multiprocessor systems, microprocessor-based systems, set top boxes, programmable consumer electronics, network PCs, minicomputers, distributed computing environments that include any of the above systems or devices, and the like.

Figure 4:
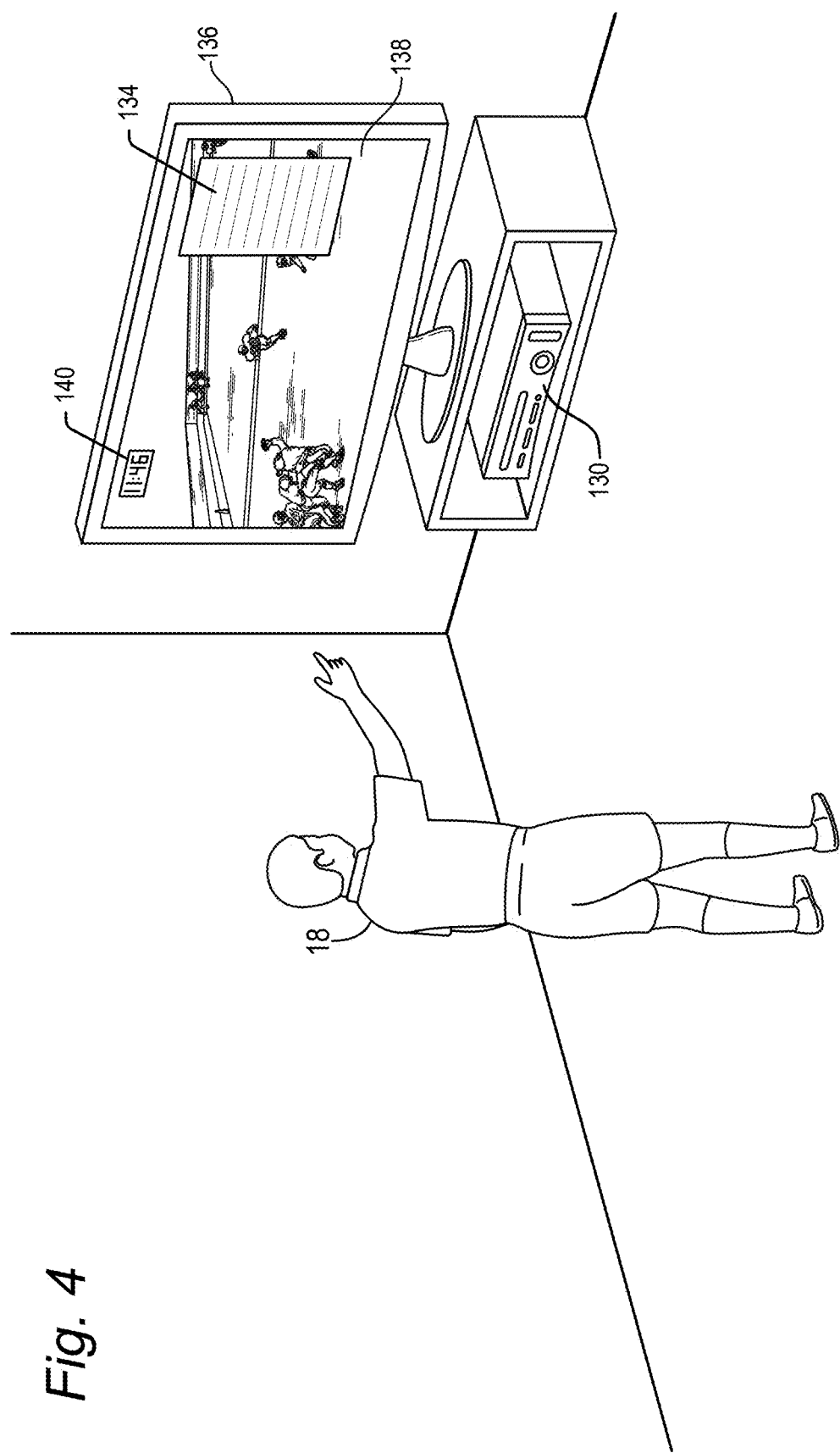
FIG. 4 depicts an alternative system implementing aspects of the present technology.

In the embodiments described above, browsing of videos may be accomplished using multiple (two or more) computing devices in a distributed computing environment. In further embodiments, a single computing device may be used to implement the browsing aspects of the present technology. In such an embodiment, shown in FIG. 4, a single computing device (for example computing device 130) may display both a video and an interactive script on a user interface 134. A user may bring up and interact with the user interface 134 via a natural user interface (NUI) to provide gestural or verbal input to the user interface 134 to select video sequences to watch on the display 138. The user interface 134 may disappear when not in use for a period of time. In the embodiment of FIG. 4, a remote control or other selection device may be used instead of a NUI system to interact with the user interface 134.

The description of the present technology below often uses an example where the event is a sporting event having a running clock associated with each sequence from a video (such as running clock 140 shown on FIGS. 3 and 4). Such sporting events include for example football games, basketball games, soccer games, hockey games, timed track and field events and timed skiing and winter sports events. In the example of a football game, a sequence is a single play that begins and ends at a set time on the game clock. However, the present technology may also be used to browse sporting events that do not have a running clock associated with sequences of a video. Such sporting events include for example baseball games, tennis matches, golf tournaments, non-timed track and field events, non-timed skiing and winter sport events and gymnastics. The present technology may also be used to browse non-sporting events where a video of the event may be divided into different sequences. For example, talk shows, news broadcasts, movies, concerts and other entertainment and current events may often be broken down into different scenes, skits, etc. Each of these is explained in greater detail below.

Figure 5:
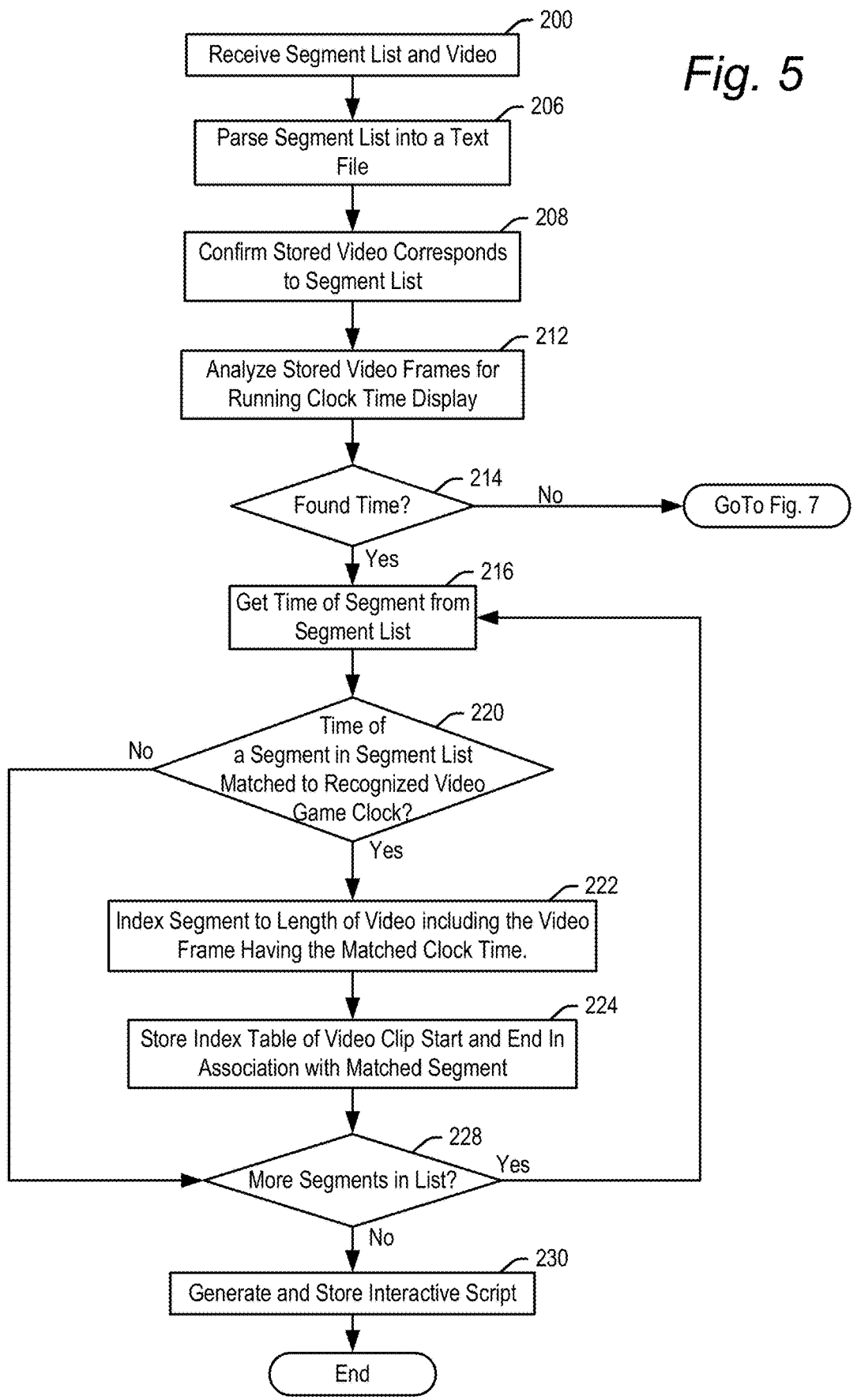
FIG. 5 is a flowchart for indexing a segment list to a video according to embodiments of the present technology.
Figure 6:
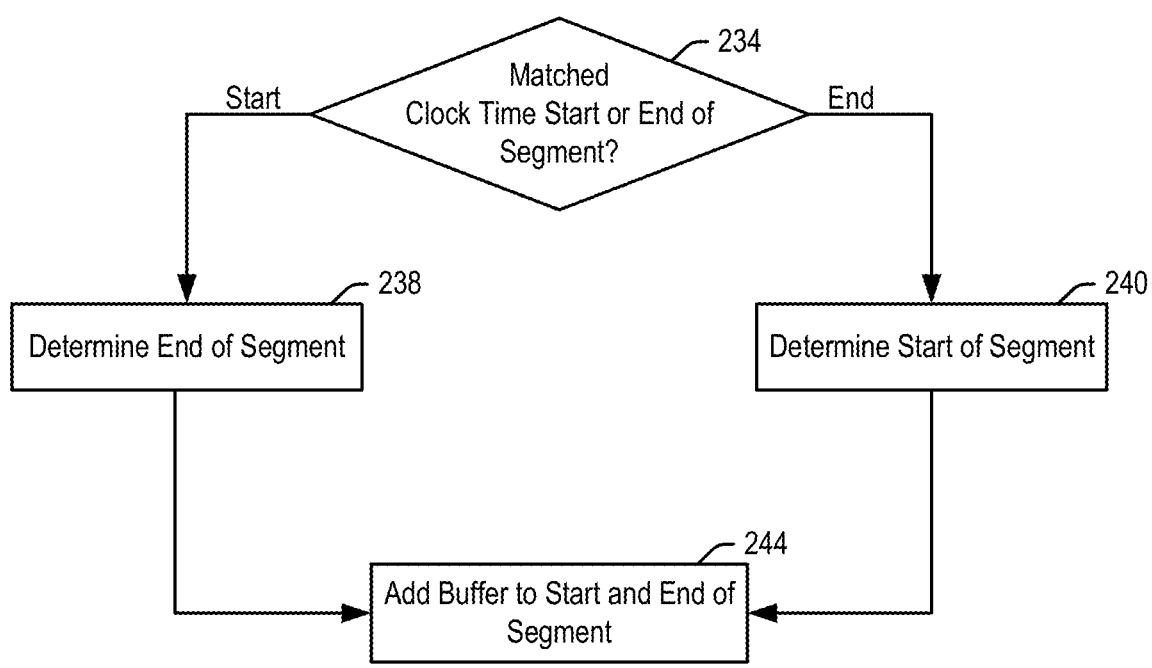
FIG. 6 is a flowchart providing more detail by step 222 from FIG. 5.
Figure 7:
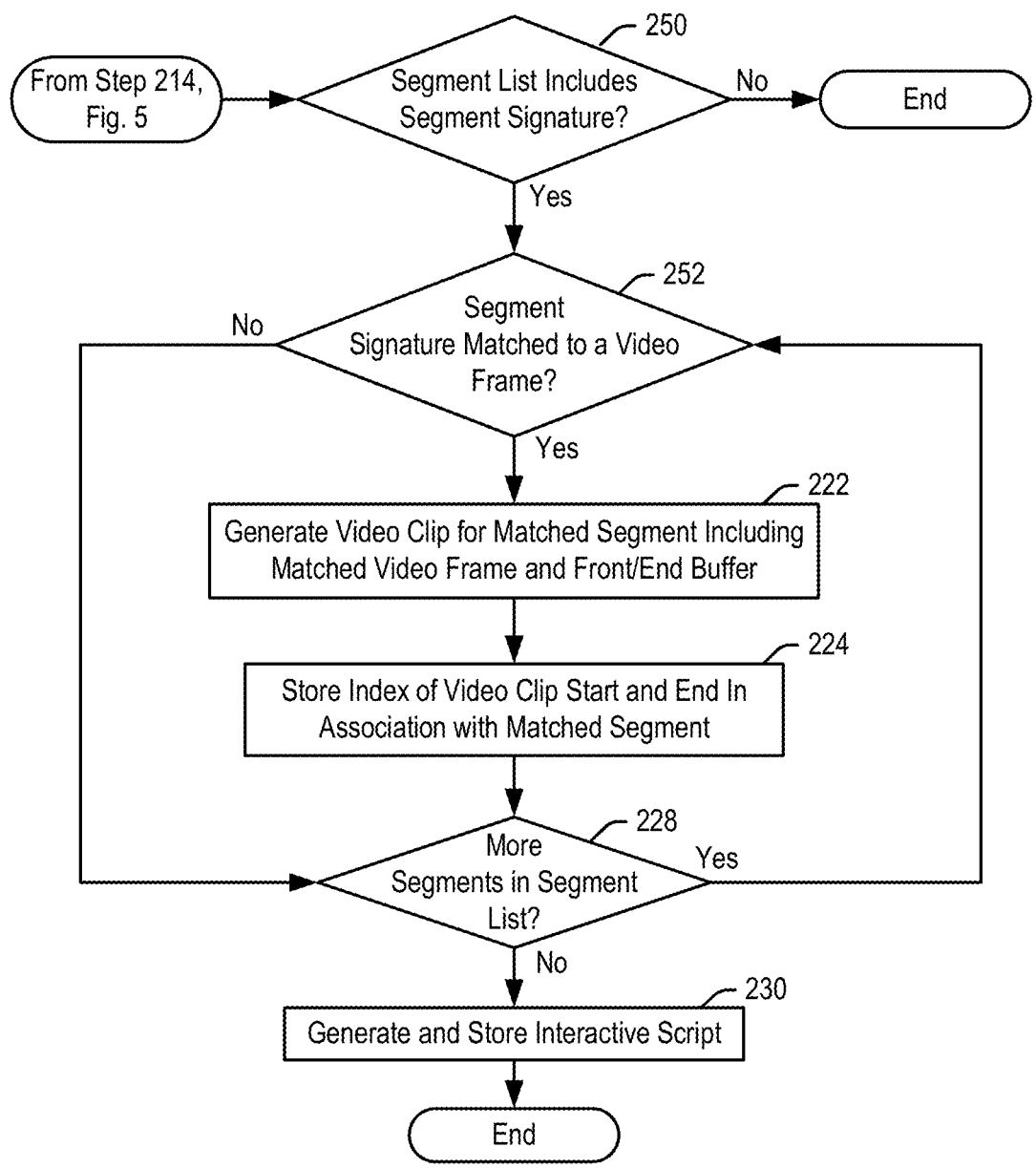
FIG. 7 is a flowchart including further steps for indexing a segment list to a video according to embodiments of the present technology.
Figure 8:
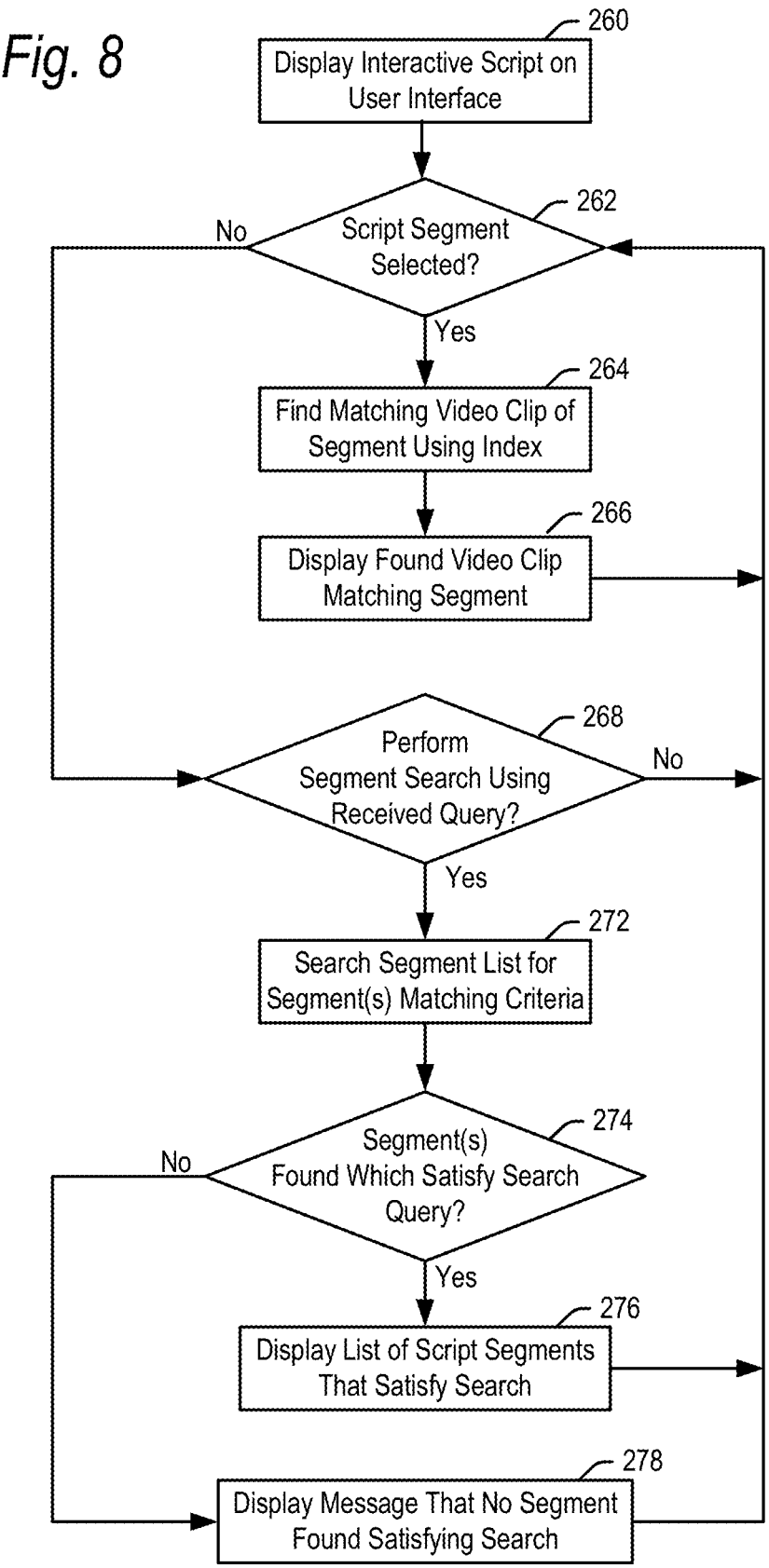
FIG. 8 is a flowchart for browsing and indexed video according to embodiments of the present technology.

Operation of the indexing engine according to embodiments of the present technology will now be explained with reference to the flowchart of FIG. 5. The indexing engine 110 may be implemented to index a PBP or other segment list to sequences from a stored video, and to define the length of video sequences associated with the segments in the segment list. This may be performed prior to a user browsing a video as shown for example in FIG. 3. In step 200, the indexing engine 110 receives a segment list 116 and video 118. The segment list may be prepared by a third-party service specifically for the video 118, and received via a network such as the Internet 117. The video may for example be broadcast via cable or satellite television, or downloaded via the internet 117.

In embodiments, the segment list 116 prepared by the third-party service may be a structured data feed including known fields of data categories. For example, where the segment list 116 is a structured feed from a football game, a first data field may describe the down (i.e., first, second, third or fourth) and the yards needed for a first down; a second data field may provide the game clock time at which the play started or ended; and a third data field may describe the play and result. These fields are a way of example only, and the segment list may include alternative and/or additional data fields. Structured data fields may be easily searched for information (such as a running game clock) that may be used to index segments from the segment list to stored video sequences of the event. In further embodiments, the segment list 116 prepared by the third-party service may alternatively be parsed into a text file in step 206 so that it may be searched for information that may be used to index segments to the stored video.

In step 208, the indexing engine 110 may confirm that the received segment list 116 corresponds to the received video 118. The video 118 may have certain descriptors or other metadata which may also be included as part of segment list 116 confirm that they correspond to each other.

In step 212, the indexing engine 110 may analyze frames of the stored video for display of a game clock having the running time for the event. For example, in a football game, the running game clock is generally displayed for each down that is played. An example of such a game clock 140 is shown FIGS. 3 and 4. A software routine, for example employing known optical character recognition techniques, may be used to analyze a video frame to identify a game clock, which will generally be in a known format. For example, the game clock in a football game will have one or two numeric digits, a colon, and then two more numeric digits.

In the description above and that follows, the example of a game clock is used to match a segment in the segment list to a sequence from the stored video. However, it is understood that, more generally, identifiers other than a game clock may appear in both the segments of the segment list and sequences from the video, and these other identifiers may be used to index segments to sequences of the video. It may be some other form of sequential alphanumeric text (ascendingly sequential or decendingly sequential) may be displayed in different sequences of the stored video and this alphanumeric text may also appear in respective segments of the segment list to mark the start or end of a sequence of the video that is described by the segment of the segment list. In this instance, the sequential alphanumeric text may be used to index the segments of the segment list to sequences of the video as described above and hereafter.

The indexing engine checks whether sequential alphanumeric text, such as a running game clock, was found in step 214. If not, the present technology employs various methods for identifying video frames at the start or end of a segment, as explained hereinafter with respect to the flowchart of FIG. 8.

However, if a game clock was identified in step 214, the indexing engine may take a game clock time of a segment from the segment list in step 216 and then determine whether a video frame is found having a game clock that matches the segment list time in step 220. For example, the indexing engine 110 may start with the first segment listed in the segment list. In a football game, this may be the opening kickoff starting with the game clock showing "15:00". The indexing engine 110 searches for a video frame including a clock time 140 of "15:00". If none is found, the indexing engine 110 may skip to step 228 to see if there more segments in the list. On the other hand, if a matching video frame is found, the indexing engine 110 may next perform step 222 of determining a length of video to index to the matched segment from the segment list as explained below.

In step 220, the indexing engine 110 may start with the first segment in the segment list 116 and proceed in succession through all segments in the segment list. However, the indexing engine 110 need not start with the first segment in further embodiments. Moreover, it is understood that several frames may have the same game clock time. For example, if the video has a frame rate of 30 frames per second, 30 frames should (ideally) have the same game clock time. In embodiments, the indexing engine 110 may take the first frame having a game clock time found to match the time of a segment from the segment list in step 220. Other frames having the matched time may be selected in further embodiments.

In step 222, the indexing engine 110 may index the segment from the segment list to a sequence of video including the video frame having the matched clock time. Further details of step 222 are now described with reference to the flowchart of FIG. 6. In step 234, indexing engine 110 determines if the video frame having the matched clock time occurs at the beginning or end of a video sequence. In particular, segment lists generally provide the time that a sequence begins. In a football game, the clock times provided in a PBP will generally be the time a play begins. However, there are instances where the clock time provided is the time that a play ends. For example, the PBP for the last play in a drive (e.g., a fourth down punt) may typically list the ending time of a play.

There are a number of ways the indexing engine 110 may recognize whether the identified video frame is at the beginning or end of a sequence. In embodiments, the indexing engine may receive information (for example from the received segment list) as to the type of event that the segment list and video relate to. The indexing engine 110 may the apply heuristics which have been stored (locally or remotely) which have been developed and stored for that type of event.

As an example, in football, individual plays are generally characterized by the players being relatively still before a play begins, then frantically moving during the play, and then moving slowly at the completion of the play. Where the indexing engine 110 receives information that the type of event is a football game, the indexing engine can examine frames before and after the identified video frame to determine the type of movement that is occurring (amount of change from frame to frame). From this, the indexing engine 110 may make a determination as to whether the identified frame is at the start or end of a play.

As another example, it is known how long football plays generally take. If the time listed in the preceding segment on the segment list is too large for a typical play, that can indicate that the current time is from the end of the next subsequent play. Other football-specific and generalized heuristics can be employed for football games, and other event-specific and generalized heuristics can be applied to events other than football games.

Another example is to use shot and/or scene detection on the video to break it into shots. In this example, the indexing engine 110 can find a video frame containing the clock time (or some other identifiable signature), thereafter find the sequence that the clock time or signature is contained in and then use the start/end time of the found sequence.

If the indexing engine 110 determines in step 234 that the matched clock time is at the start of a segment, the indexing engine 110 may determine the end of the video sequence in step 238. It may do so using the same or similar heuristics applied in step 234. For example, in a football game, the video may be examined to find the start of the play and then thereafter when the players slow down and stop. This may be considered the end of the play. The determined start and end times of the video sequence determined to correspond to the current segment may be stored.

Conversely, if the indexing engine 110 determines in step 234 that the matched clock time is at the end of sequence, the indexing engine 110 may determine the start of the sequence in step 240. Again, the same or similar heuristics as applied in step 234 may be applied in step 240 to work backwards from the end the sequence to determine the start of sequence. The determined start and end times of the video determined to correspond to the current segment may be stored.

When a user views a video sequence as explained below, it may be desirable to have a buffer at the start and end of the video sequence to provide a lead in and lead out for the video sequence. As such, in step 244, the indexing engine 110 may add a buffer of for example a few seconds to start and end of determined length of the video sequence. The buffer at the start or end of a video sequence may be omitted in further embodiments.

Referring again to FIG. 5, once a specific video sequence (including the video of a sequence and a start and end buffer) has been indexed to a segment from the segment list, an index table may be created and stored in step 224. The index table may store the indexed video sequence in association with the corresponding segment from the segment list. The index table may store, for each segment from the segment list, the start and end times where the corresponding video is found in the stored video. In further embodiments, the indexing engine 110 may store the specific video sequences separately, one stored video sequence for each segment in the segment list.

In step 228, the indexing engine 110 may check if there are more segments in the segment list for matching to sequences in the video. If so, the indexing engine 110 return to step 216 to get the time of another segment from the segment list, and steps 220, 222, 224 and 228 are repeated.

On the other hand, if all segments in the segment list 116 have been accounted for in step 228, the indexing engine 110 may generate and store an interactive script for display on a user interface in step 230. As explained below, the interactive script may be displayed to a user on the user interface 134. The user may select script segments from the interactive script, and then be shown the video sequence which has been indexed to that script segment. Each script segment from the interactive script may be generated from the respective segments from the segment list. For example, a script segment may be populated with some or all of the data fields and/or parsed text from a segment in the segment. Thus, the video sequences can be said to be indexed to the script segments, in that the video sequences are indexed to segments from the segment list, which segments are in turn used to generate corresponding script segments in the interactive script.

Additionally, each script segment may include hypertext or otherwise be hyperlinked to the index table created and stored in step 224. Thus, when a user selects a particular script segment from the interactive script, the index table may be accessed to determine which indexed video sequence is associated with that script segment. Instead of being created by the indexing engine 110, some or all of the interactive script may be generated by browsing engine 134 as explained below.

As noted above, not all video events have a running game clock. Certain athletic contests such as baseball and tennis matches may be played to completion regardless of how long they take. Additionally, the present technology may operate on stored video events unrelated to sports, and which have no running game clock. If no game clock is discerned from examining frames of a video in step 214, the indexing engine 110 may next look for a segment signature as shown in step 250 of FIG. 7.

A segment signature may be data describing a particular frame of video from the stored video of the event. This segment signature may be generated by the third-party at the time they prepare the segment list, and may describe a video frame at the start of a segment, though it may be the end of a segment in further embodiments.

As one example, a segment signature may be stored image data (jpeg, gif, etc.) from a single frame of the video which the third-party provider grabs from the video at the start of a video sequence and stores in association with the segment from the segment list. Thus, each segment from the segment list will have an associated segment signature which describes a single point in the video of the event. In further embodiments, the segment signature may be a time in the video. That is, the video of the event begins at time to, a first sequence starts at video run time $t_1$, a second sequence starts at video run time t2, etc. The segment signature for a particular sequence may thus be the video run time at which that sequence begins (or ends).

In step 250, the indexing engine 110 may check whether the segments in the segment list received from a third party include associated segment signatures. If not, the indexing engine 110 may not generate the interactive script for that video and the operation of the indexing engine 110 may end.

On the other hand, if segment signatures are included with the segment list, in step 252 the indexing engine 110 may determine whether a given stored segment signature matches to a point in the video. As indicated above, this comparison may involve comparing stored image data against the image data of successive frames of the video until a match is found.

A number of technologies exist for abstracting or summarizing data of a signature and video frames for the purposes of comparison and finding a match. One example of such technology is disclosed in US Patent Publication No. 2012/0008821 entitled "Video Visual and Audio Query." That patent publication describes different examples for extracting image signatures from video frames, to be compared with each other in order to find matching video frames. In one such example, the system divides each video frame image into 64 (8×8) equal size rectangular ordered cells. In each cell, the system can generate two ordered bits. For example:
   a. 1st bit=1 if the right half of the cell is brighter than the left half, and =0 if it's darker.
   b. 2nd bit=1 if the upper half of the cell is brighter than the lower half, and =0 if it's darker.

Using this system, for both the signature and the video frames in a video, the indexing engine 110 can develop ordered lists of 128 bits each, coming from the 64 ordered cells in a signature/video frames. The ordered lists from the signature can be compared against the ordered list of the video frames to find a match. Other examples from Patent Publication No. 2012/0008821 may also be used.

Instead of image data from the video, it is conceivable that the signature be audio data, for comparison against audio data in the video. An example for comparing audio data from a signature and video is disclosed in US Patent Publication No. 2012/0296458, entitled "Background Audio Listening for Content Recognition." One example disclosed in that patent publication, a signature comprised of sequence of audio can be processed using a feature extraction algorithm in any of a variety of ways including for example applying a Hamming window to the audio data, zero padding the audio data, transforming the data using fast or discrete Fourier transform, and applying a log power. This processed audio signature may then be compared against audio segments from the video, which may be processed in a similar manner.

Other known technologies for processing image and/or audio data from the video and four performing the comparison of the data may be used. As indicated above, the matching may instead involve finding the video run time corresponding to the video run time stored as the segment signature for a given segment.

If no match is found in step 252, the indexing engine may check for more segments in the list in step 228 (as above). On the other hand, if a match is found, the segment associated with the segment signature is indexed to the video including the matched video point. In particular, the indexing engine may determine a length of the video sequence to index to the matched segment from the segment list (step 222), and the length of the indexed video sequence may then be stored in association with the matched segment from the segment list (step 224), which steps have been explained above. In step 228, the indexing engine 110 may check if there are more segments in the segment list for matching to a point in the video. If so, the indexing engine 110 may return to step 252 to get the next segment signature from the segment list, and steps 252, 222, 224 and 228 are repeated. If there are no more segments in the segment list, an interactive script of segments and indexed video sequences are generated and stored in step 230 as explained above.

Once an interactive script for a stored video has been generated and stored as explained above, a user may browse the stored video via the browsing engine 124. Operation of an embodiment of the browsing engine will now be explained with reference to the flowchart of FIG. 8, and the illustrations of FIGS. 2-4 and 9-11.

In step 260, a user may access an interactive script for a stored video for display on a user interface 134. As noted, the interactive script includes a listing, or script, of the segments from the segment list, set up with hypertext or with hyperlinks. The links are set up so that, once a specific script segment is selected, the indexing table retrieves the associated video sequence from memory.

The user interface 134 may be displayed on a display of the computing device 120 as shown in FIG. 3, or the user interface 134 may be displayed on a display 138 associated with the computing device 130 as shown in FIG. 4.

FIGS. 9-11 illustrate examples of different interactive scripts 150 which may be displayed by the browsing engine 124 on user interface 134. FIG. 9 is an interactive script 150 associated with a stored video of a football game. FIG. 10 is an interactive script 150 associated with a stored video of a baseball game. FIG. 11 is an interactive script of a stored video of a non-sports related event, a talk show in this example.

The interactive scripts of FIGS. 9-11 are by way of example only, and may vary widely in different embodiments. However, in general, the interactive script 150 allows a user to select a particular script segment displayed on the interactive script 150, and the indexed video sequence is in turn displayed to the user from the stored video. The interactive script 150 may be stored locally on computing device 120 and/or 130. Alternatively, the interactive script 150 may be stored in remote storage 122 (FIG. 2) and downloaded to computing device 120 and/or 130. As noted above, the indexed video associated with the interactive script 150 may be stored locally on computing devices 120 and/or 130, or remotely in storage 122.

As seen in FIGS. 9-11, an interactive script 150 may include script segments 150*a*, 150*b*, 150*c*, etc., each being selectable with hypertext or a hyperlink. The interactive script may include the same or similar descriptive elements as the underlying segment list, such as a description of the indexed video sequence and, if applicable, players involved in the sequence and a game clock time showing the start or end time of the indexed video sequence. In appearance, the displayed interactive script may be similar to or the same as the underlying segment list used to generate the interactive script. In embodiments, the interactive script may in fact be the segment list, augmented with hypertext or hyperlinks that enable retrieval of the appropriate video sequence upon selection of a particular script segment. The interactive script 150 need not have the same or similar appearance as the underlying segment list in further embodiments.

The interactive script 150 may include fewer or greater numbers of script segments than are shown in the figures. For example, an interactive script for a whole football game may include more script segments than are shown in the example of FIG. 9, and an interactive script for a whole baseball game may include more script segments than are shown in the example of FIG. 10.

In step 262, the browsing engine 124 may look for user selection of a script segment from the interactive script 150. Once a selection is received, the browsing engine 124 finds the video sequence indexed to the selected script segment in step 264 using the stored index table. That video sequence is then displayed to the user in step 266, for example on display 138. It is conceivable that a user may be able to select multiple script segments. In this instance, the multiple video sequences indexed to the multiple selected script segments may be accessed, and then played successively. Upon completion of a displayed video sequence, the video may end. Alternatively, the stored video may continue to play forward from that point.

As an example, referring to FIG. 9, a user may select script segment 150*f* relating to a 58 yard touchdown pass from T. Brock to D. Smith. A user may select script segment 150*f* via a pointing device such as a mouse, or by touching the user interface where user interface is a touch sensitive display. In embodiments utilizing a NUI system as shown in FIG. 4, a user may point to script segment 150*f*, verbally select the script segment 150*f*, or perform some other gesture to select the script segment 150*f*. Once selected, a video of the 58 yard touchdown pass may be displayed to the user from the video stored of the event.

Similarly, in the example of FIG. 10, a user may select script segment 150*h* of the home run by C. Davies and the segment 150*m* of the strikeout by N. McCloud. These video sequence may then be displayed to the user one after the other. In the talk show example of FIG. 11, a user may select one of the script segments from the show, such as for example script segment 150*f*, and the video sequence corresponding to that script segment may then displayed to the user. As noted above, the interactive scripts 150 shown in FIGS. 9-11, and the specific selected script segments, are by way of example only and may vary greatly in further embodiments.

Referring again to FIG. 8, instead of selecting a script segment, the browsing engine 124 and the user interface 134 may present the user with the ability to perform a segment search using a search query. For example, the user may be presented with a text box in which to enter a search query, at which point the browsing engine 124 searches the interactive script 150 in step 272 for all script segments that satisfy the search query. The search may be a simple keyword search, or may employ more complex searching techniques for example using Boolean operands.

In step 274, the browsing engine 124 determines whether any script segments satisfy the search query. If not, a message may be displayed to the user that no script segments were found satisfying the search. On the other hand, if script segments were found satisfying the search query, those script segments may be displayed to the user, or otherwise highlighted in the overall interactive script 150. Thereafter, the flow returns to step 262 where the browsing engine 124 looks selection of a script segment.

Thus, in the football game example of FIG. 9, a user may choose to view all plays resulting in a "touchdown." Upon entering the query "touchdown" in the text box, the browsing engine 124 can search through the interactive script 154 for all plays that resulted in a touchdown. As a further example, a user may follow certain players, for example their favorite players or players on their fantasy football team. A user can enter their name in the search query, and the browsing engine 124 can return all plays involving that player. The search query operations of browsing engine 124 can similarly operate in other embodiments, including for example the baseball game of FIG. 9 and the talk show of FIG. 10.

As noted, the appearance of the interactive scripts 150 shown in FIGS. 9-11 is by way of example only. FIG. 12 illustrates another possible appearance of the interactive script 150 where the individual script segments 150*a*, 150*b*, etc., are displayed as separate, selectable blocks. In a further example, the user interface 134 may display the interactive script 150 graphically. For example, for a football game, the browsing engine 124 can display a "drive chart," graphically showing each play as an arrow displayed over a football field, with each arrow representing if and by how much the football was advanced in a given play. For basketball, the browsing engine 124 can display an image of the court with graphical indications showing from where shots were taken (the color of the graphical indication possibly representing whether the shot was made or missed). For baseball, the browsing engine 124 can display an image of the field with lines shown for where the ball traveled. Alternatively or additionally, an image of the strike zone can be displayed. In any of these examples, the browsing engine 124 can detect when a user has selected a particular segment from the graphical interactive script, and thereafter display the video sequence for that segment. Still further appearances of script segments from an interactive script 150 are contemplated.

In embodiments described above, the indexing engine 110 and browsing engine 124 operate separately. However, in further embodiments the indexing engine 110 and browsing engine 124 may be integrated together. In such an embodiment, the segment list may be used as the interactive script. That is, the segment list may be received from the third-party with hyperlinks, or otherwise augmented with hyperlinks, so that each segment in the segment list may be displayed on the user interface 134 as a selectable link.

In this embodiment, a user may select one of the segments displayed on the user interface 134. At that point, the combined indexing/browsing engine may examine the selected segment for a running clock time or a segment signature as described above. If found, the indexing/browsing engine may then examine the stored video to find the corresponding video sequence. That video sequence may then be displayed to the user, possibly adding a buffer at the start and/or end of the video segment.

It may happen that a stored video, such as that for sporting event, may include video replays of certain sequences. For example, in a football game, networks often show replays of eventful passes, runs, defensive plays, penalties, etc. In embodiments, it may be advantageous to identify a video replay of the sequence as opposed to the video of the underlying sequence itself. For example, when indexing segments from the segment list to video sequences, it may be beneficial to index to the video sequence itself as opposed to a replay of the video sequence.

Various generalized and event-specific heuristics may be employed by the indexing engine 110 to identify a replay of a sequence and distinguish that replay from the underlying sequence. For example, in football games, replays are generally shown without display of the running game clock. Additionally, networks typically flash a network logo or some other graphic at the start and end of a replay to highlight that it is a replay that is being shown. Replays are also often shown at slower than normal speeds. The indexing engine 110 may include rules to look for these and other characteristics of a replay so as to determine when the video is of a replay. Once a replay is identified, it can be omitted from a video sequence indexed to a specific segment from the segment list. Alternatively, the replay may be included as part of the video sequence that is indexed to that segment.

A system as described above provides several advantages for a user viewing a stored event. First, a user may quickly and easily browse directly to points in the stored video that are of particular interest to the user, and the user can skip over commercials and other less interesting portions of the stored video. Thus, user can create a customized and personal "highlight reel," including highlights from the event, or for specific aspects or people in the event. Additionally, where the user is storing a video and begins watching part way through recording of the event, the user may select sequences of interest from that portion which is already been recorded and quickly catch up to the most current time of recording.

Figure 13:
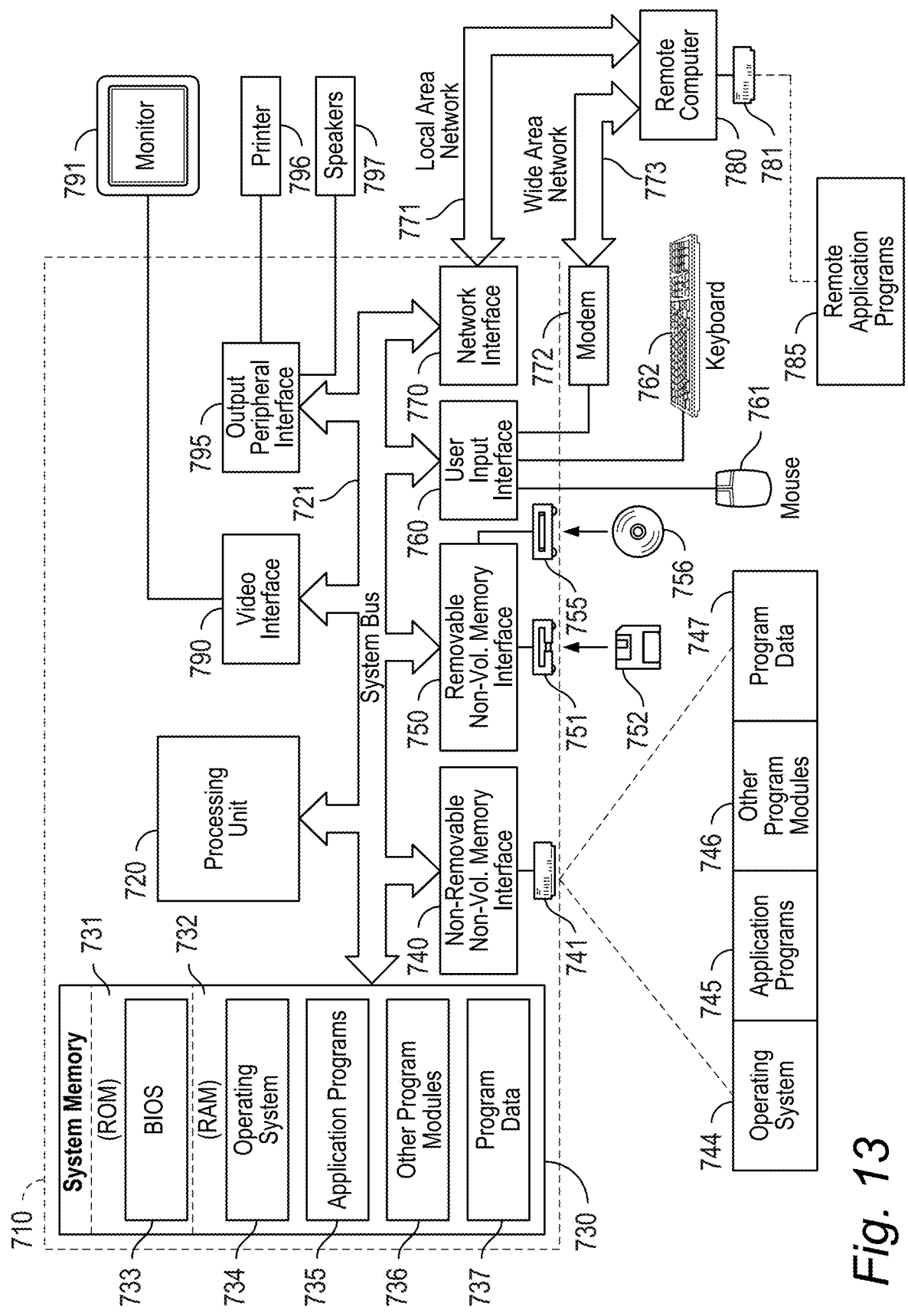
FIG. 13 is a block diagram of an exemplary processing device.
Figure 14:
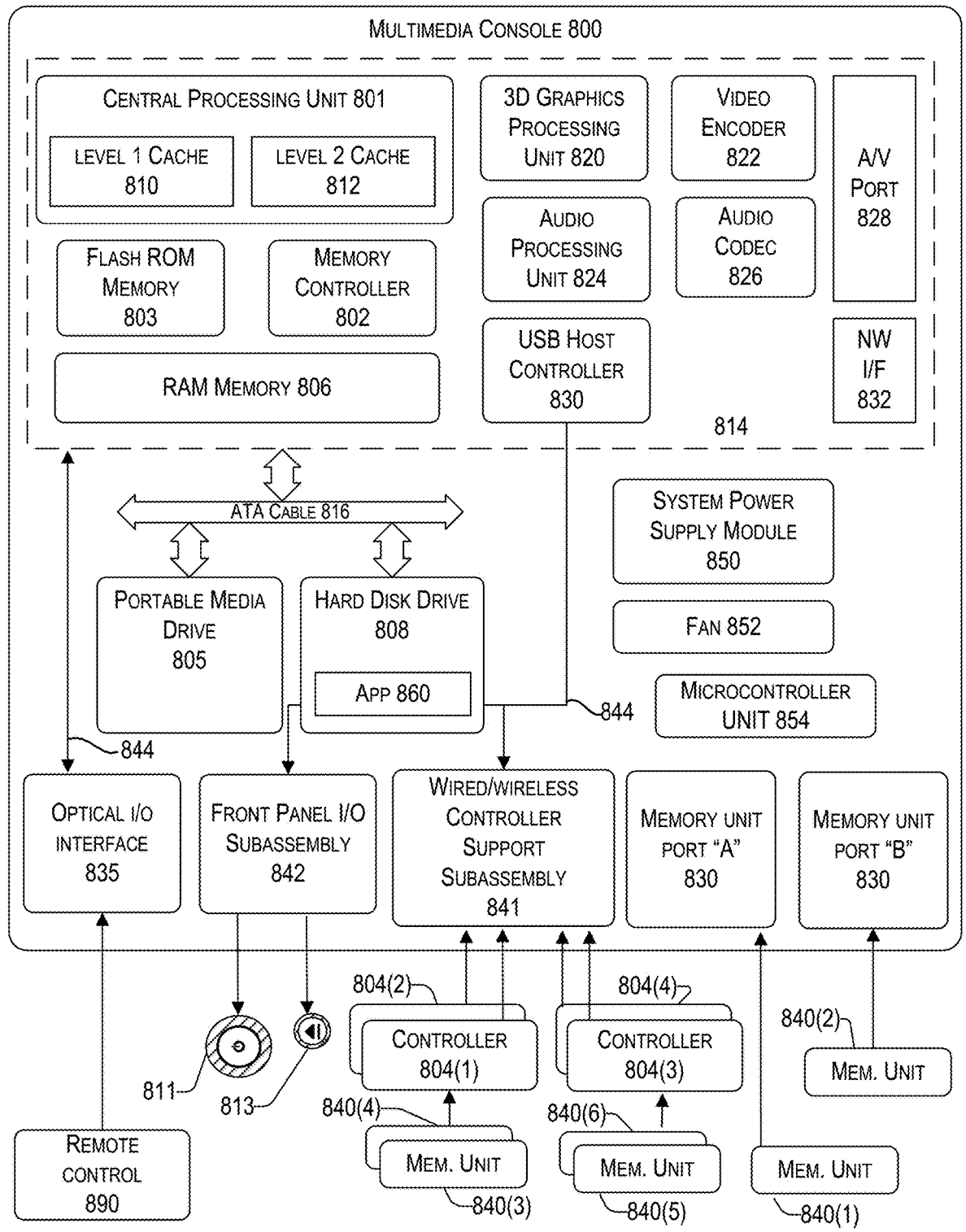
FIG. 14 is a block diagram of an exemplary console device.

FIGS. 13 and 14 illustrate examples of a suitable computing system environment which may be used in the foregoing technology as any of the processing devices described herein, such as computing devices 100, 120 and/or 130 of FIGS. 1-4. Multiple computing systems may be used as servers to implement the place service.

With reference to FIG. 13, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. Computer readable media can be any available tangible media that can be accessed by computer 710, including computer storage media. Computer readable media does not include transitory, modulated or other transmitted data signals that are not contained in a tangible media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the information and which can accessed by computer 710.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 13 illustrates operating system 734, application programs 735, other program modules 736, and program data 737.

The computer 710 may also include other removable/non-removable, volatile/nonvolatile computer storage media. By way of example only, FIG. 13 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 13, provide storage of computer readable instructions, data structures, program modules and other data for the computer 710. In FIG. 13, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although a memory storage device 781 has been illustrated in FIG. 13. The logical connections depicted in FIG. 13 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 13 illustrates remote application programs 785 as residing on memory device 781. It will be appreciated that the network connections shown are exemplary and other means of establishing a communications link between the computers may be used.

FIG. 14 is a block diagram of another embodiment of a computing system that can be used to implement computing devices such as computing device 130. In this embodiment, the computing system is a multimedia console 800, such as a gaming console. As shown in FIG. 14, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 805. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 814.

FIG. 14 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 14, console 800 includes a controller support subassembly 841 for supporting four controllers 804(1)-804(4). The controller support subassembly 841 includes any hardware and software components to support wired and wireless operation with an external control device, such as for example, a media and game controller. A front panel I/O subassembly 842 supports the multiple functionalities of power button 811, the eject button 813, as well as any LEDs (light emitting diodes) or other indicators exposed on the outer surface of console 802. Subassemblies 841 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of multimedia console 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Multimedia console 800 may be operated as a standalone system by simply connecting the system to audio/visual device 16, a television, a video projector, or other display device. In this standalone mode, multimedia console 800 enables one or more players to play games, or enjoy digital media, e.g., by watching movies, or listening to music. However, with the integration of broadband connectivity made available through network interface 832, multimedia console 800 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of browsing a stored video, comprising:
retrieving a segment signature describing a particular frame of video from the stored video;
examining a sequence of sequences of the stored video to find a match to the segment signature by comparing data of the segment signature with audio data or image data of the sequence of the stored video;
indexing the sequence of the stored video with the segment signature in response to the match to the segment signature;
generating an interactive script segment that includes a text narrative of the sequence of the stored video based on the data of the segment signature and the audio data or the image data of the sequence of the stored video;
displaying a plurality of interactive script segments including the interactive script segment on a display of a computing device;
receiving selection of two or more interactive script segments including the interactive script segment displayed via the display, the selection indicating two or more sequences of the stored video that a user wants displayed; and
sequentially displaying the two or more sequences of the stored video corresponding to the two or more interactive script segments in response to the selection of the interactive script segment.

2. The method of claim 1, further comprising:
receiving a search query to identify one or more interactive script segments of the plurality of interactive script segments, results for the search query including the selection of the interactive script segment.

3. The method of claim 1, wherein the displaying the plurality of interactive script segments on the display of the computing device comprises displaying the plurality of interactive script segments on a user interface of a first computing device.

4. The method of claim 3, wherein the displaying the plurality of interactive script segments on the display of the computing device further comprises displaying the sequence of the stored video on a display associated with a second computing device different than the first computing device.

5. The method of claim 4, wherein the first computing device and the second computing device are networked together to provide an experience distributed across the first computing device and the second computing device.

6. The method of claim 4, wherein the receiving the selection of the two or more interactive script segments displayed via the computing device comprises receiving the selection of the two or more interactive script segments via one of a user selection device or a touch of the display.

7. The method of claim 3, wherein the displaying the two or more sequences of the stored video matched to the interactive script segment comprises displaying the two or more sequences of the stored video on the display of the first computing device.

8. A computer readable medium for programming a processor to perform a method of browsing a stored video using a segment list which describes sequences of the stored video, comprising instructions to:

retrieve sequential information stored in association with a segment of the segment list, wherein the sequential information includes data describing a particular frame of video from the stored video;

examine a sequence of the sequences of the stored video to find a match to the sequential information by comparing the data of the sequential information with audio data or image data of the sequence of the stored video;

index the sequence of the stored video with the segment in response to the match to the sequential information;

generate an interactive script segment that includes a text narrative of the sequence of the stored video based on the data of the sequential information and the audio data or the image data of the sequence of the stored video;

present a graphical user interface including an interactive script having a plurality of interactive script segments corresponding to segments in the segment list, wherein the plurality of interactive script segments includes the interactive script segment;

receive selection of two or more interactive script segments of the plurality of interactive script segments from the graphical user interface, the two or more interactive script segments including the interactive script segment, the selection indicating two or more sequences of the stored video that a user wants displayed; and sequentially display the two or more sequences of the stored video that correspond to the selection of the two or more interactive script segments.

9. The computer readable medium of claim 8, wherein the sequential information comprises alphanumeric text, and wherein the computer readable medium further comprises instructions to:

identify the alphanumeric text in both the segment and the sequence of the stored video; and index the segment to the sequence of the stored video based on the alphanumeric text.

10. The computer readable medium of claim 8, wherein the sequential information comprises game clock time, and wherein the computer readable medium further comprises instructions to:

identify the game clock time in both the segment and the sequence of the stored video; and index the segment to the sequence of the stored video based on the game clock time.

11. The computer readable medium of claim 10, further comprising instructions to:

determine whether the game clock time in the segment represents a beginning or end of the sequence of the stored video.

12. The computer readable medium of claim 11, wherein the segment list is a play-by-play of one of a football game, a basketball game, a soccer game, a hockey game, a timed track and field event, or a timed winter sports event.

13. The computer readable medium of claim 8, wherein the segment list is a play-by-play of one of a baseball game, a tennis match, a golf tournament, a non-timed track and field event, a non-timed winter sports event, or a gymnastics event.

14. The computer readable medium of claim 8, wherein the segment list is from a non-sports related event including one of a talk show, a news broadcast, a movie, or a concert.

15. A system for browsing a stored video, comprising:

a first device configured to transmit selection of two or more interactive script segments of a plurality of interactive script segments of an interactive script to a second device, wherein each of the plurality of interactive script segments include text narratives of sequences of the stored video; and a second device configured to:

retrieve sequential information stored in association with a segment of a segment list, wherein the sequential information includes data describing a particular frame of video from the stored video;

examine a sequence of the sequences of the stored video to find a match to the sequential information by comparing the data of the sequential information with audio data or image data of the sequence of the stored video;

index the sequence of the stored video with the segment in response to the match to the sequential information;

generate an interactive script segment based on the data of the sequential information and the audio data or the image data of the sequence of the stored video;

receive the selection of the two or more interactive script segments from the first device, wherein the two or more interactive script segments include the interactive script segment; and display two or more sequences of the stored video indexed to segments that correspond to the selection of the two or more interactive script segments.

16. The system of claim 15, further comprising a third device configured to display the sequence of the stored video corresponding to the selection of the two or more interactive script segments.

17. The system of claim 16, wherein at least two of the first device, the second device, or the third device are integrated together within a single component.

18. The system of claim 15, wherein the sequential information comprises alphanumeric text, and wherein the second device is further configured to:

identify alphanumeric text in both the segment and the sequence of the stored video; and index the segment to the sequence of the stored video based on the alphanumeric text.

19. The system of claim 15, wherein the sequential information comprises a game clock time, and wherein the second device is further configured to:

identify the game clock time in both the segment and the sequence of the stored video; and index the segment to the sequence of the stored video based on the game clock time.

20. The system of claim 15, wherein the text narratives include a listing of plays of a game, a time associated with each of the plays, a description of each of the plays, or a result of each of the plays.

* * * * *